United States Patent [19]

Magee et al.

[11] Patent Number: 4,588,460

[45] Date of Patent: May 13, 1986

[54] METHOD AND APPARATUS FOR RECAPPING A TIRE WITH A FLEXIBLE SEGMENTED MOLD

[75] Inventors: Arthur W. Magee, Richardson; Richard D. Shockley, Dallas; Michael E. Crawford, Irving, all of Tex.

[73] Assignee: Long Mile Rubber Co., Inc., Dallas, Tex.

[21] Appl. No.: 601,543

[22] Filed: Apr. 18, 1984

[51] Int. Cl.[4] ............................................. B29D 30/58
[52] U.S. Cl. .................................. 156/96; 156/909; 425/17; 425/20; 425/47; 264/36
[58] Field of Search ...................... 156/95–97, 156/909; 425/14, 17, 19, 20–25, 47; 264/36

[56] References Cited

U.S. PATENT DOCUMENTS

| | | | |
|---|---|---|---|
| 1,748,590 | 2/1930 | Vincent | 156/95 |
| 2,014,010 | 9/1935 | Wheatley | 156/96 |
| 2,370,655 | 3/1945 | Glynn | 425/22 |
| 2,372,217 | 3/1945 | MacMillan | 425/47 |
| 2,429,715 | 10/1947 | Glynn | 425/22 |
| 3,983,193 | 9/1976 | Wulker et al. | 156/909 |
| 3,999,907 | 12/1976 | Pappas | 425/47 |
| 4,053,265 | 10/1977 | Wulker et al. | 156/96 |
| 4,500,375 | 2/1985 | Goldstein | 156/96 |

FOREIGN PATENT DOCUMENTS 555680  9/1943  United Kingdom ............... 156/96

Primary Examiner—Lois E. Boland
Attorney, Agent, or Firm—Jerry W. Mills; Gregory M. Howison

[57] ABSTRACT

A method and apparatus for retreading a tire includes a mold segment (14) having open ends (16) and (18). A tire carcass (10) has a layer of uncured rubber (12) built up on the surface thereof. The mold (14) is disposed therearound with ribs (20) resting on the surface thereof. A semi-flexible cap (24) is disposed over the ends (16) and (18) which are separated by a gap (20). An elastic strap (26) is then wrapped about the assembly to secure the mold (14) to the built up tire carcass (10). An envelope (28) is then wrapped about the assembled tire carcass (10) to provide a radially inward force thereto. The whole assembly is then cured in a curing oven.

16 Claims, 17 Drawing Figures

METHOD AND APPARATUS FOR RECAPPING A TIRE WITH A FLEXIBLE SEGMENTED MOLD

TECHNICAL FIELD OF THE INVENTION

The present invention pertains in general to tire recapping and, more particularly, to tire recapping with flexible segmented molds.

BACKGROUND OF THE INVENTION

The recapping of tires with flexible molds has heretofore been accomplished by first building up a layer of uncured rubber on a buffed tire carcass. A flexible ring mold having a negative tread pattern imprint is then placed around the built-up tire and the whole assembly placed in a sealing envelope. This whole assembly is then placed into a vulcanizing chamber and the rubber is cured with the imprint of the mold contained therein.

During placement of the mold over the built-up tire, the mold must be stretched and expanded to allow the tread pattern to fit around the built up tire. Alternatively, the tire must be "buckled" to receive the mold and then inflated against the mold. During curing of the rubber with the mold so disposed, the rubber assumes a plastic state, thereby allowing the mold tread pattern to sink into the rubber to form the positive contour of the tread. This process is normally assisted by some form of external force such as high chamber pressure applied to the mold, the aspiration and resiliency of the sealing envelope or pressure applied to the built up tire to force outward against the mold.

A prior retread method utilizing a flexible continuous mold is disclosed in U.S. Pat. No. 4,053,265 issued to Wulker on Oct. 11, 1977. The Wulker patent discloses an expandable continuous or ring mold that is resilient enough to resume its initial state after it is stretched and disposed about the tire. However, several disadvantages exist in this type of mold in that the mold is difficult to stretch for disposal about the tire. This process is relatively difficult and usually requires expensive equipment and often more than one operator to place the mold about the tire. If the mold is not properly placed about the tire, misalignment of tread design can occur which would result in a reject. Moreover, repeated stretching of such prior molds can cause deterioration of the molds.

Ring molds of this type also have the disadvantage that a separate ring mold must be provided for each tire size and each ring mold must accommodate all variances in a given tire size. Depending upon the tire size, the circumference between various tires within a particular size can vary as much as one to five inches. As the tire size varies, the clearance between the mold and the built up tire also varies. This variance results in additional problems in placing the mold on the built-up tire and can cause misalignment of the tread pattern during the handling and vulcanization process.

In view of the above, there exists a need for a tire retreading process that utilizes a mold that is relatively easy for an operator to utilize and which accommodates the variations in a given tire size.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
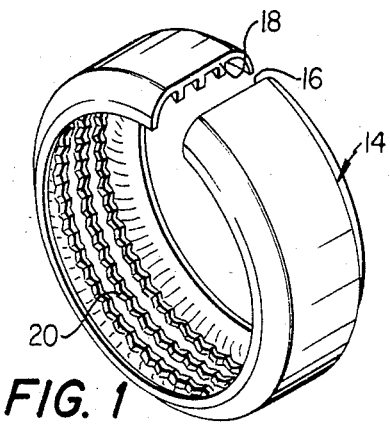
FIG. 1 illustrates a perspective view of a flexible mold in accordance with the present invention being placed around a prepared tire carcass.

Referring now to FIG. 1, there is illustrated a perspective view of a segmented mold 14 for use in recapping a tire in accordance with the present invention. The mold 14 is a one piece flexible mold that is not continuous about the circumference thereof and is split at one point to form two defined ends 16 and 18. A series of ribs 20 are formed on the inner surface of the mold 14 and comprise the negative contour of the desired tread pattern that is to be imprinted in the recapped tire.

Figure 2:
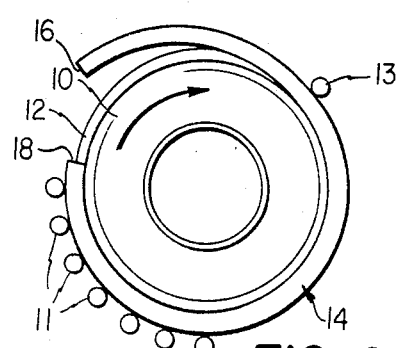
FIG. 2 illustrates a stitcher imbedding the mold into the uncured rubber layer on the prepared tire carcass.

Referring now to FIG. 2, there is illustrated a prepared tire carcass 10 which is prepared by buffing the surface thereof and applying cement thereto. A layer of uncured rubber 12 is then built up on the surface of the tire carcass 10 to provide a built-up tire. In accordance with the present invention, the ends 16 and 18 are separated and the built-up tire carcass 10 disposed therein. It is very important to place the ribs 20 of the tread pattern against the uncured rubber layer 12 with a minimum amount of movement therebetween. If the ribs 20 were allowed to move relative to the uncured rubber layer 12 during placement of the mold 14 about the built-up tire carcass 10, misalignment of the tread pattern could occur. To prevent this, the mold 14 and the built-up tire carcass 10 are placed onto an arcuate roller bed 11 that conforms to the surface of the mold 14. This roller bed 11 is referred to as a "stitcher". A hold down roller arm 13 is then lowered against the built-up tire carcass 10 and mold 14 external to the mold 14 and diametrically opposite the roller bed 11. The hold down roller 13 presses the ribs 20 into the uncured rubber layer 12 to minimize lateral movement of the mold 14 relative to the built-up carcass 10. Both the mold 14 and built-up tire carcass are then rotated together until the mold 14 fully encircles the built-up tire carcass 10. As will be described hereinbelow, a gap is formed between the ends 16 and 18 of a predetermined maximum dimension and this may require passing the assembled unit through the apparatus of FIG. 2 until the desired dimension of this gap is realized. By utilizing the flexible mold 14 as a segmented mold rather than a continuous ring type mold, the need for stretching the mold about the built-up tire carcass 10 is eliminited. This results in less stretch on the mold.

Figure 3:
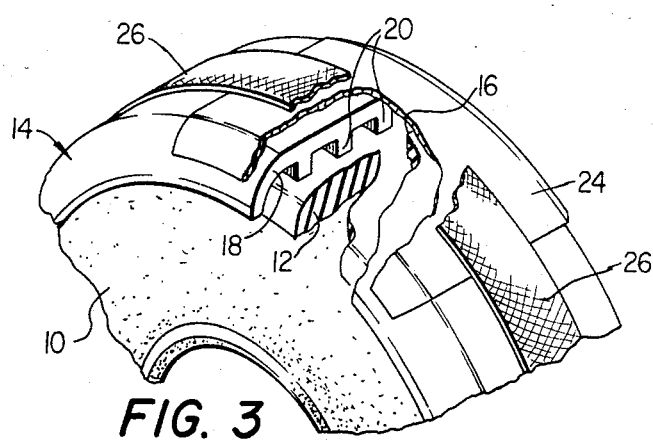
FIG. 3 illustrates a cutaway perspective view of a built up tire with the mold in place and illustrating the gap between two sections of the mold.
Figure 4:
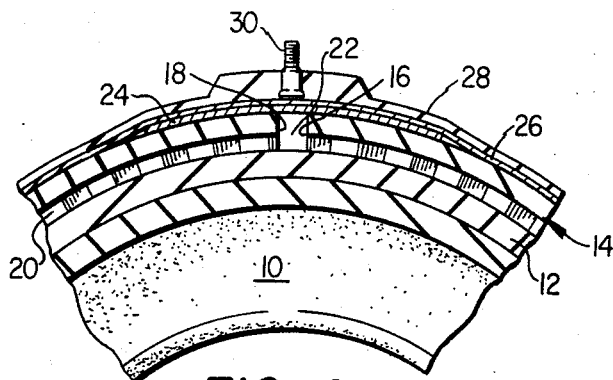
FIG. 4 illustrates a cross-sectional view of the mold of FIG. 3.

Referring now to FIGS. 3 and 4, there are shown perspective and cross-sectional views, respectively, of the flexible recapping mold 14 mounted on the tire carcass 10. When the mold 14 is initially placed about the built-up tire, the outer ends of the ribs 20 touch the exterior surface of the uncured rubber layer 12 leaving space between the innermost areas of the mold 14 and the built-up tire. This results in an expansion of the circumference of the mold 14 about the built-up tire carcass 10. Since the mold is segmented and not a continuous ring, a gap 22 is formed between the free ends 16 and 18. Gap 22 may vary in dependence with the tire circumference, as the mold 14 may accommodate various tire sizes. When the ribs 20 are pressed into the layer of uncured rubber 12 during curing, as will be subsequently described, the overall circumference of the mold 14 decreases and the ends 16 and 18 tend to abut. If the gap 22 were not provided, the overall circumference of the mold 14 could not decrease without the ends 16 and 18 pressing against each other and causing a deformation in the mold 14.

After the mold 14 is disposed around the built-up tire, a semi-flexible cap 24 is then disposed over the gap 22. The semi-flexible cap 24 extends several inches on each side of the mold gap and is operable to prevent the ends 16 and 18 of the mold 14 from abutting and pushing radially outward, thereby distorting the tread pattern. The semi-flexible cap 24 can be fabricated from a synthetic rubber compound, which provides a semi-flexible conformation. This synthetic rubber compound can be a blend of styrene butadiene and natural rubber.

A strip 26 is disposed around the assembly of the mold 14 and built up tire carcass 10. The strip 26 is functional to secure the mold 14 and the cap 24 firmly against the layer of uncured rubber 12 to facilitate handling. The strip 26 can range between two inches to six inches in width and may compromise either a continuous elastic band fabricated from Chlorobutyl or pre-shrunk nylon cured tape. The elastic band need only be stretched around the assembly, whereas the nylon tape must be stapled at one end, then wrapped about the assembly and then stapled at the free end to the mold 14. The nylon tape is manufactured by Burke Narrow Fabric Corp., Charlotte, N.C. In placing the strip 26 about the mold, it is first wet and, after placement, heated to promote shrinkage. A typical volumetric shrinkage is from six to eight percent.

After the mold is secured about the built-up tire, the assembly is placed into a conventional flexible tubular or toroidal rubber envelope 28 which is described in U.S. Pat. Nos. 4,053,265, 4,269,644 and 4,185,056, each of which is incorporated herein by reference. The flexible envelope 28 has an air passage 30 connected thereto for communicating the interior of the flexible envelope 28 to the exterior thereof. The flexible envelope 28 is tightly fitted to force the mold against the layer of uncured rubber and is functional to evacuate air that surrounds the mold and the uncured rubber layer 12 during curing thereof. In so doing, gas is prevented from being entrapped between the mold and the uncured rubber layer 12. The strip 26 functions as a "wicking" layer to aid in dispelling gas from between the tread and mold.

The assembly with the flexible envelope 28 disposed therearound is then placed onto a rim and the tire carcass 10 pressurized. This pressurized assembly is then placed into an evacuated curing oven and the temperature raised to approximately 212°–300° F. This is a conventional curing process and is further described in U.S. Pat. Nos. 4,185,056 and 4,269,644. The pressure in the chamber is less than the pressure internal to the tire carcass 10 such that a differential in pressure results. This differential pressure, in addition to the pressure of the envelope 28 about the tire, forces the ribs 20 into the uncured rubber layer 12 and brings the ends 16 and 18 into abutment. The layer 12 is then allowed to cure, thus retaining the imprint of the ribs 20.

When the assembly of FIG. 4 in the flexible envelope 28 is placed into the curing oven, the ribs 20 of the mold 14 begin to press into the layer 12 when sufficient heat is supplied thereto prior to any significant curing. As the mold 14 sinks into the layer 12, the outer circumference of the mold 14 decreases. This results in a decrease in dimension for the gap 22 and abutment of the edges 16 and 18. It is important to dimension the mold such that the final position of the mold 14 upon curing of the layer 12 allows the ends 16 and 18 to substantially abut since the mold 14 has not been deformed by stretching. If an excessive amount of force results from abutment of the ends 16 and 18, the ends will tend to push radially outward from the tire. The cap 24 tends to disperse this outward force. A typical gap between the ends 16 and 18 may be ⅛ to ⅜ inch for a passenger vehicle and ¼ to ½ inch for truck tire.

The mold 14 is initially fabricated by forming a layer of uncured rubber about a circular reference matrix having the positive contour of the desired tread pattern. This layer of uncured rubber is then cured by conventional techniques and then peeled away from the matrix. The mold can then be cut at one or more positions to make corresponding segments. Alternatively, the reference matrix may be in the shape of a segment. If the mold is fabricated from conventional materials, it may be necessary to employ the use of a mold release layer between the mold 14 and the uncured rubber layer 12 such that removal of the mold 14 after curing is facilitated. In addition, a wicking layer may also be employed therebetween to aid in venting gasses. In the preferred embodiment, the material utilized is a rubber manufactured under the tradename Chlorobutyl manufactured by Exxon Chemical Americas in Houston, Texas, although numerous other rubber types may be alternatively used. A specific example of the use of Chlorobutyl is as follows:

| Material | Manufacturer or Source | Manufacturer or Commercial Designation | Parts by Volume |
|---|---|---|---|
| elastomer | Exxon | Chlorobutyl HT-1066 | 100.00 |
| carbon black | Commercially available | N330 | 60.00 |
| magnesium oxide | Commercially available | Maglite | .35 |
| Napthenic oil | Sun Oil | Circosol oil (4240) | 5.00 |
| Stearic acid | Commercially available | Stearic acid Flake | 1.00 |
| Dyphene | Sherwin Williams | Dyphene 8318 | 2.00 |
| Zinc Oxide | Commercially available | Zinc Oxide | 5.00 |
| Tetra Methyl Thiuran DiSulfide | Commercially available | TMTD | 1.00 |
| Mercapto Benzyl Thiazole DiSulfide | Commercially available | MBTS | 1.50 |

Chlorobutyl rubber may be utilized both for the mold 14 and for the cap 24. The properties of Chlorobutyl facilitate removal of the mold from the layer 12 after curing of the tire without the necessity of a mold release layer. In addition, the presence of the gap 22 allows the layer 12 to be cured without the requirement for a wicking layer since gasses can escape through the gap 22.

Figure 5:
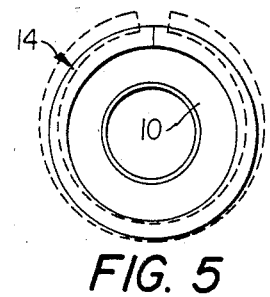
FIG. 5 illustrates a schematic diagram of a tire utilizing a single segment mold having a single gap.

Referring now to FIG. 5, there is illustrated a schematic diagram of the mold 14 disposed about the built up tire carcass 10. Dotted lines illustrate the position of the mold 14 prior to insertion into the oven and the solid lines illustrate the position wherein the gap 22 is closed. In designing the mold, the amount of "sink" for the tread ribs into the rubber must be accounted for, as well as the circumference of the inner surface of the mold. For example, if the built-up tire circumference is set equal to the inner surface mold circumference and both are equal to 80 inches and a typical tread rib has a depth of approximately 0.312 inches, this would result in a rib circumference of approximately 78 inches. Therefore, the difference between the rib circumference and the circumference of the inner surface of the mold would be approximately two inches. This would cause the gap 22 to be approximately two inches if the ribs 20 did not penetrate into the uncured rubber layer 12. However, in placing the mold about the built-up tire, the apparatus described in FIG. 2 is utilized for initially placing the layer of uncured rubber 12 onto the tire carcass 10. By using the stitcher, the ribs 20 can be pressed into the layer 12 such that they partially penetrate the surface, thereby forming a smaller gap. Preferably, the gap should be between 0.125 inches to 0.475 inches, although the gap length may substantially vary depending upon the tire type. The gap should never exceed optimum limits established for a given tire size.

Figure 6:
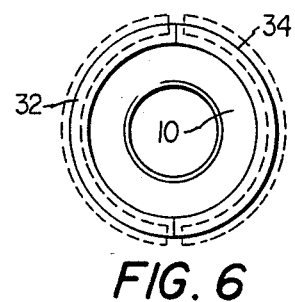
FIG. 6 illustrates a schematic diagram of a tire with a two section mold disposed therearound.
Figure 7:
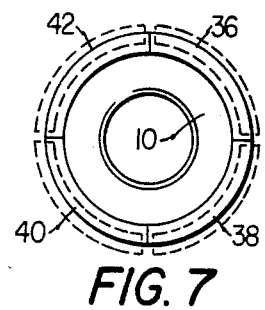
FIG. 7 illustrates a schematic diagram of a tire having a four section mold disposed thereabout.

Referring now to FIG. 6, there is illustrated a schematic diagram for an alternate embodiment that utilizes two segmented half molds 32 and 34. The two half molds 32 and 34 are similar to the single mold 14 except that the resulting assembly will have two gaps. In FIG. 7 there is illustrated a schematic diagram utilizing four mold segments 36, 38, 40 and 42. By utilizing two or more segments, it is possible to reduce the initial gap without having to significantly press the mold segments into the uncured rubber layer 12. For example, the four segment mold of FIG. 5 as applied to the above described example would allow a total of two inches worth of gap. This gap is divided between all four segments, thereby resulting in gaps of a maximum of 0.5 inches. The range of each specific gap does not change, but the accumulated gap spread increases because of the increased number of gaps.

Figure 8:
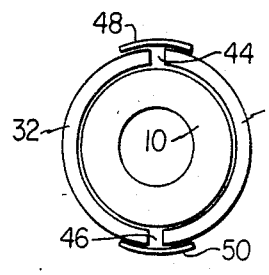
FIG. 8 illustrates a schematic diagram of a tire with the two section mold disposed thereabout and sealing caps adjacent the gaps.

Referring now to FIG. 8, there is illustrated a schematic diagram of the two segment mold of FIG. 4 prior to curing. Initially, the mold halves 32 and 34 have a gap 44 formed at one end and a gap 46 formed at the other end. A cap 48 is disposed adjacent the gap 44 and a cap 50 is disposed adjacent the gap 46. The caps 48 and 50 are similar to the cap 24. Prior to curing, the elastic band 26 (not shown) is wrapped about the assembly to secure the caps 48 and 50 against the mold halves 32 and 34 and in general immobilize the mold halves 32 and 34 and the caps 48 and 50. The assembly is then placed into an envelope, a rim disposed within the tire carcass 10 and pressure applied thereto. This assembly is then placed into a curing oven according to the process described above.

Figure 9:
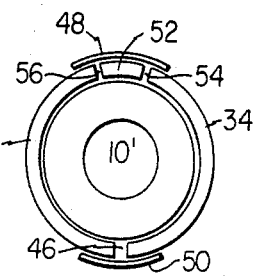
FIG. 9 illustrates an alternate embodiment of the view of FIG. 8 with a segment disposed in the gap to accommodate varying tire sizes.

Referring now to FIG. 9, there is illustrated an alternate embodiment of the mold of FIG. 8 with the mold halves 32 and 34 disposed about a tire carcass 10'. The built-up tire carcas 10' has a diamter that is slightly larger than the built-up tire carcass 10. To accommodate for this increased circumference, a mold sizing segment 52 is disposed between the ends of the mold halves 32 and 34, thus forming a gap 54 and a gap 56. Each of the gaps 54 and 56 are dimensioned similar to the gaps 44 and 46 of FIG. 6. Segment 52 is a combination of the tread pattern of mold segments 32 and 34. The elastic band 26 (not shown) is then wrapped about the mold segments 32 and 34, the sizing segment 52 and the caps 48 and 50.

In retreading conventional tires, a given tire size may vary from one to five inches in circumference, depending upon the tire type, which is a significant percentage that must be accounted for. By placing the sizing segment 52 between the ends of the two mold sections 32 and 34, this variance can be accommodated, such that the mold ends adjacent all of the gaps abut when the tire is cured. Without this segment, various size mold halves are required. In addition, a series of segments can be provided such that one set of mold halves can span between two to three tire sizes, thereby reducing the inventory of molds that must be carried. When an operator is placing the mold halves about the built-up tire, it is then only necessary to place the proper segment between the ends of mold halves to properly size the tire for both tire size and variance within that tire size.

Figure 10:
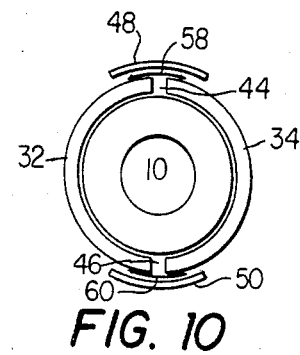
FIG. 10 illustrates an alternate embodiment of the mold of FIG. 8 with nylon tape spread across the gaps to facilitate placement.
Figure 11:
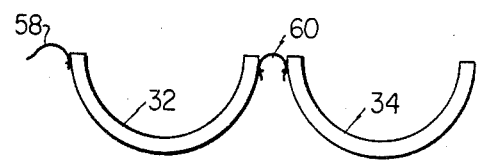
FIG. 11 illustrates the mold of FIG. 10 with the mold opened up.

Referring now to FIGS. 10 and 11, there is illustrated the preferred embodiment of the view of FIG. 8 utilizing the mold halves 32 and 34, wherein like numerals refer to like parts in the two figures. To aid in dimensioning the gaps properly, a layer 58 of nylon tape is disposed across the gap 44 and a layer 60 of nylon tape is disposed across the gap 46. Each of the layers 58 and 60 are stapled on either sides of the respective gaps to define the maximum gap width. This eliminates the requirement for the first layer of tape 26, as described above with reference to FIG. 3.

In constructing the assembly of FIG. 10, the mold half 32 is first placed onto the built-up tire carcass 10 using the stitcher of FIG. 2 and then the second mold half 34 has one end thereof placed adjacent the mold half 32 to form the gap 46 within the appropriate constraints. The tape layer 60 is then stapled to prevent the gap 46 from increasing beyond these constraints. The mold half 32 is then stitched with the apparatus of FIG. 2 to the remaining part of the built-up tire carcass 10 until the gap 44 is within the constraints. At this point, the tape layer 58 is stapled across the gap 44. The caps 48 and 50 are then placed over the layers 58 and 60 and the assembly processed as described above. When the mold halves 32 and 34 are removed from the cured tire, it is only necessary to unstaple one side of the layer 58 and leave the layer 60 attached to each of the halves 32 and 34. This results in the assemby of FIG. 12 wherein the tape layer 60 remains in place.

Figure 12:
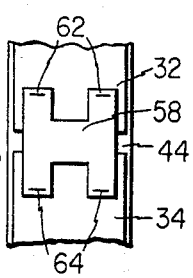
FIG. 12 illustrates a planar view of the gap in FIG. 10.

Referring now to FIG. 12, there is illustrated a planar view of the tape layer or strap 58 which is comprised of two strips disposed across the gap 44 and spaced apart. As described above, the straps 58 are attached to the mold half 32 by staples 62 and attached to the mold half 34 by staples 64. When the two mold halves 32 and 34 abut together, the strap 58 is resilient enough to buckle, thereby preventing an opposing tangential force at the gap 44. The straps 58 and 60 can be fabricated of Chlorobutyl.

Figure 13:
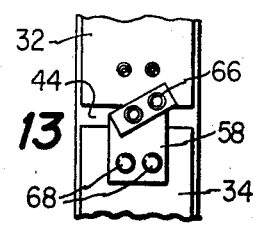
FIG. 13 illustrates a planar view of an alternate embodiment of the gap securing device with a series of snaps utilized.

An alternate embodiment of straps 58 and 60 which does not require staples is illustrated in FIG. 13. The strap 58 is attached to the mold half 32 by snaps 66 and to the mold half 34 by snaps 68. By utilizing snaps, the mold halves 32 and 34 can be fabricated in a ready-to-use condition. By disposing the mating halves of the snaps at the appropriate distances, it is not necessary to measure the distances but, rather, it is only necessary to mate the snaps on the straps 58 and 60 with the mating portions on the mold halves 32 and 34. This prevents an operator from forming an assembly with gaps that are too large.

Figure 14:
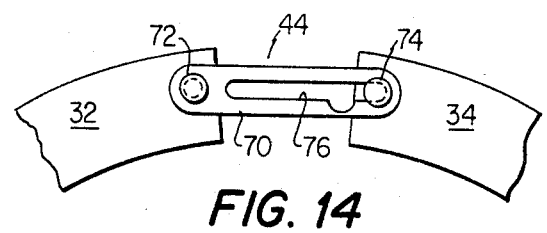
FIG. 14 illustrates a restraining device utilized to limit the size of the gap.

Referring now to FIG. 14, there is illustrated an alternate embodiment of limiting the gap dimensions on interconnected mold segments. A longitudinal flat member 70 is pivoted about a point 72 on the side of the mold 32. A sliding pin 74 is disposed on the end of the mold 34 opposite the gap 44 from the mold half 32. The longitudinal member 70 has a slot 76 formed therein that is dimensioned to fit over the sliding pin 74. At one extreme, the gap 44 is maximum and at the other extreme, the ends just abut. Therefore, the longitudinal member 70 maximizes the gap 44, allows the gap to narrow during curing and also prevents the ends from abutting and pushing upward.

Figure 15:
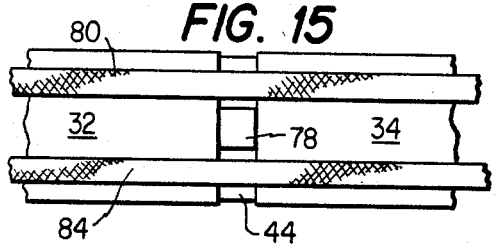
FIG. 15 illustrates a planar view of a spacing member utilized to preset the gap.
Figure 16:
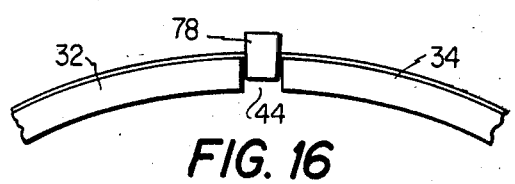
FIG. 16 illustrates a side view of the spacing member of FIG. 15.

Referring now to FIGS. 15 and 16, there is illustrated an alternate method for ensuring that the gap 44 is formed. A spacing member 78 is disposed in the gap 44 during the formation thereof. Rather than utilizing the solid nylon strap 26 for securing the assembly, two thin nylon or Chlorobutyl straps 80 and 84 are disposed along the circumferential edges of the mold halves 32 and 34. This secures the mold halves to the built-up tire carcass 10 while the spacing member 78 prevents the gap 44 from being reduced in width. After the assembly is formed, the spacing member 78 is removed and the tire processed as described above.

Figure 17:
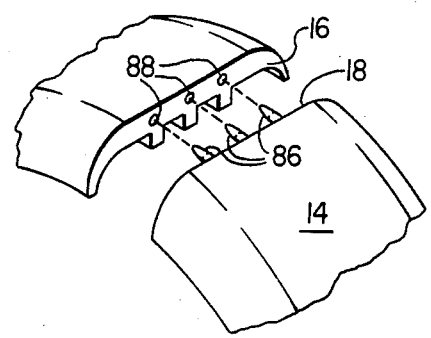
FIG. 17 illustrates an interlocking mechanism to prevent relative lateral movement of the mold segments.

Referring now to FIG. 17, there is illustrated an interlocking mechanism for preventing lateral movement of the ends 16 and 18 of the mold 14. The interlocking mechanism consists of male plugs 86 attached to the end 18 and aligned tangentially with the mold 14 and female receptacles 88 in the end 16. The male plugs 86 are mated with the female receptacles 88 such that closure of the gap 22 results in insertion of the male plugs 86 into the female receptacles 88. In this manner, lateral displacement of the mold about the gap 22 is prevented.

In processing the tire from the initial casing to the final assembly that is placed in the curing oven, the following process steps are utilized.

1. The tire casing has the outer surface thereof buffed and cement applied thereto.
2, The cemented casing is placed on a tread builder with a stitcher arm.
3, A predetermined die size of uncured rubber is placed around the tire that is disposed on the tread builder.
4. One of the mold sections for a two section mold is placed on top of the built up casing and the stitcher arm lowered to secure this mold against the casing.
5. The second half of the two piece mold is placed against the tire and each of the gaps spliced with a layer of nylon tape unless one gap has already been spliced, in which case only the remaining gap need be spliced.
6. (optional) A length of nylon tape has one end thereof stapled to the mold and then wrapped 360° about the mold to overlap with the other end of the tape and then the free end of the tape is stapled to the mold. The nylon tape is wet before placing about the tire. This tape holds two mold sections securely against the built tire.
7. If necessary, a segment is disposed within the gap such that the ends are between $\frac{1}{8}$th to $\frac{3}{8}$th of an inch for a passenger tire or $\frac{1}{4}$ to $\frac{1}{2}$ inch for a truck tire.
8. Each gap is covered with a cap.
9. A second layer of tape is applied and stapled around the cap to secure the cap against the mold. The tape is prewet before disposal on the mold.
10. The tape is allowed to dry for a short amount of time, resulting in a six to eight percent reduction in circumference. Steps 9 and 10 and optional step 6 eliminated by using an elastic band fabricated from Chlorobutyl.
11. The envelope is applied and then a rim is inserted into the tire and the curing process is proceeded with.

In fabricating a recapped tire, any of the mold configurations described above can be utilized. The following are examples of such use.

EXAMPLE 1

A single mold section having only one gap was utilized to recap a tire having a size 10.00–20 (bias). A tire carcass was built up to a circumference of 126.0625 inches. The mold was fabricated on a mold matrix that had a circumference of 128.5 inches with a mold rib circumference measurement of 125.0 inches. The mold was applied to the built-up tire and stitched until the gap between the mold ends equalled 0.5 inch. The tire was wrapped with wet nylon tape and covered with an envelope. A rim was then applied to the tire and the tire was cured. The cure time was three hours and forty five minutes at a temperature of 260° F. The pressure inside of the tire carcass was 140 psi and the pressure external the tire was 70 psi. The resulting space between the bottom of the tread and the tire carcass, termed the "undertread", measured between 5/32–6/32 inches with the tread less than $\frac{1}{8}$th of an inch off center. The adhesion of the cured tread pattern to the tire carcass was 105 pounds per inch (ppi).

EXAMPLE 2

A two part equal length mold was formed and a tire recapped having a tire size of 205/70R14 (radial). The built-up tire circumference measure 79.875 inches with a mold rib circumference of 79.0 inches. The mold was stitched onto the built-up tire to yield a gap of 0.4375 inches. The tire was covered by a butyl stretch band and a cap placed over each gap area. The tire was covered with an envelope for aspiration therein and then placed on a rim and cured. The cure time was two hours and fifteen minutes at a temperature of 300° F. The pressure within the tire was 105 psi and the pressure external to the tire was 70 psi. The tire exhibited excellent definition of tread design with tread design ⅛th inch off center.

In summary, there has been provided a recapping process for recapping built-up tires with a segmented flexible mold. The segmented flexible mold is placed around a built-up tire and the ribs forming the negative contour of the tread pattern are then set into the uncured rubber on the built-up tire. The mold is then secured against the built-up tire such that the ends of the molds segments have a gap formed therebetween. This assembly is placed into a curing envelope and then into a curing chamber for curing thereof.

Although the preferred embodiment has been described in detail, it should be understood that various changes, substitutions, and alterations can be made therein without departing from the spirit and scope of the invention as defined by the appended claims.

What is claimed is:

1. A method for recapping tires utilizing uncured rubbed and a prepared tire carcass, comprising:
   building up the prepared tire carcass with a layer of the uncured rubber;
   disposing the negative contour of a tread pattern of a nonsticking, heat resistant elastomeric, segmented mold adjacent the uncured rubber layer, the segmented mold having at least two free ends such that the segmented mold can be opened for disposal about the prepared tire carcass;
   separating the ends of the segmented mold by a predetermined gap prior to curing;
   applying external pressure to the segmented mold directed radially inward in order to maintain the position of the mold on the tire carcass; and
   curing the layer of rubber to form the positive contour of the tread pattern therein, said gap between the ends of the segmented mold closing during curing to prevent rubber from being forced upward into the gap and to prevent the mold from being pushed radially outward from the tire carcass.

2. The method of claim 1 and further comprising forcing the negative contour of the tread pattern on the segmented mold into the uncured rubber layer to set the gap to a predetermined dimension.

3. The method of claim 1 wherein the segmented mold is comprised of two 180° segments having matching tread patterns, each of the segments individually disposed on the built up tire and the gaps between the free ends of the individual segments set to a predetermined maximum dimension prior to curing.

4. The method of claim 1 wherein the segmented mold is comprised of four segments, each of the segments individually placed about the built-up tire with the gaps between the ends of all the segments set to a predetermined maximum dimension.

5. The method of claim 1 and further comprising disposing a sizing segment between the free ends of the segmented mold, the sizing segment having the negative contour of the tread pattern disposed on the undersurface thereof and operable to accommodate variances in the size of the built-up tire relative to the size of the segmented mold.

6. The method of claim 1 wherein the pressure applied to the segmented mold conforms the segmented mold to the surface of the built-up tire such that the pressure is applied to the entire surface of the mold.

7. The method of claim 1 and further comprising disposing an elastic band around the circumference of the segmented mold to secure the segmented mold against the built-up tire during handling.

8. The method of claim 1 wherein the step of applying pressure comprises placing the built-up tire and segmented mold into a toroidal envelope that is resilient and tight fitting to force the segmented mold against the layer of uncured rubber.

9. The method of claim 1 and further comprising disposing a layer of semi-resilient material over the gap and slideably securing the semi-resilient layer over the gap such that the free ends of the segmented mold are prevented from radially outward displacement of the built-up tire when the free ends abut.

10. A method for recapping tires utilizing uncured rubber and a prepared tire carcass, comprising:
    building up the prepared tire carcass with a layer of uncured rubber;
    disposing a first mold segment comprising nonsticking heat-resistant elastomeric material and having first and second ends on the built-up tire, the first mold segment having the negative contour of a desired tread pattern formed on the inner surface thereof and disposed adjacent the periphery of the built-up tire, the tread pattern comprised of ribs directed downward into the layer of uncured rubbed on the built-up tire;
    disposing on the built-up tire a second mold segment comprising nonsticking, heat-resistant, elastomeric material and having first and second ends, the second segment having a negative contour of said desired tread pattern with ribs formed on the inner surface thereof;
    orienting the first and second mold segments adjacent the uncured rubber layer such that the first ends are paried and the second ends are paired, the end pairs being separated by a gap of a predetermined maximum dimension prior to curing;
    applying an external force to the first and second mold segments directed radially inward;
    curing the layer of rubber such that the external force causes the ribs of the first and second mold segments to fully imbed in the layer of uncured rubber, the first each pair abutting and the second end pair abutting during curing.

11. The method of claim 10 and further comprising disposing a sizing segment between the first end of the first mold segment and the first end of the second mold segment to accommodate a variance in size of the built-up tire, the sizing segment dimensioned to maintain gap dimensions between the first and second mold segments and the sizing segment at the predetermined maximum dimension prior to curing.

12. The method of claim 10 and further comprising disposing a semi-resilient cap over the gaps between the first and second mold segments and applying the external force to the caps such that the abutted first and second end pairs are prevented from displacing radially outward from the prepared tire carcass.

13. The method of claim 10 wherein the step of applying the external force comprises;
wrapping an elastic band circumferentially around the first and second mold sections; and
disposing the banded assembly into a toroidal shaped flexible envelope, the envelope elastically wrapping about the assembly to conform the first and second mold segments to the built-up tire surface.

14. The method of claim 10 and further comprising disposing a layer of material across the gaps and securing the layer at either end thereof to prevent the gap from increasing beyond a predetermined limit such that handling of the tire does not increase the gap dimension.

15. The method of claim 14 wherein securing of the layers comprises snapping the layer onto predisposed snap receptacles on the first ends of the first and second mold segments.

16. A method for recapping tires utilizing uncured rubber and a prepared tire carcass, comprising:
building up the prepared tire carcass with a layer of uncured rubber;
disposing a mold segment comprising non-sticking heat-resistant elastomer on the built-up tire, the mold segment having two ends and the negative contour of the tread pattern formed on the interior side thereof adjacent the built-up tire surface, the negative contour comprised of a pattern of ribs that are operable to press downward into the uncured rubber layer to form the positive contour of the tread pattern therein;
setting the mold segment into the surface of the uncured rubber layer such that the ribs partially press downward into the uncured rubber layer;
disposing a sizing segment between the ends of the mold segment, the sizing segment having a tread pattern on the interior side thereof similar to the tread pattern in the mold segment, the sizing section dimensioned such that adjacent ends of the mold segment and sizing segment abut when the ribs are fully imbedded in the layer of uncured rubber layer with a gap formed between adjacent ends having predetermined maximum dimensions when the ribs are only partially imbedded prior to curing;
disposing a semi-flexible cap over each of the gaps between the mold segments;
disposing an elastic band circumferentailly around the mold segments and the caps to secure the caps against the segment ends such that displacement of the segment ends radially outward is prevented;
disposing a toroidally shaped elastic envelope around the assembly to apply conforming pressure on the surface of the mold segments to force the mold segments radially inward; and
curing the uncured rubber layer such that the mold segment ribs press downward into the uncured rubber layer to form the positive contour of the tread pattern therein.

* * * * *

UNITED STATES PATENT AND TRADEMARK OFFICE
CERTIFICATE OF CORRECTION

PATENT NO. : 4,588,460
DATED      : May 13, 1986
INVENTOR(S): Arthur W. Magee, et al.

It is certified that error appears in the above-identified patent and that said Letters Patent is hereby corrected as shown below:

Col. 6, line 25, "diamter" should be --diameter--.
Col. 8, line 8, "2," should be --2.--

Col. 9, line 5, "measure 79.875" should be --measured 79,875--.
Col. 9, line 34 (Claim 1), "rubbed" should be --rubber--.
Col 12, line 20, Claim 16), "Circumferentailly" should be --circumferentially--.

Signed and Sealed this

Twenty-sixth Day of August 1986

[SEAL]

Attest:

DONALD J. QUIGG

Attesting Officer

Commissioner of Patents and Trademarks